(12) United States Patent
Chou

(10) Patent No.: US 6,398,377 B1
(45) Date of Patent: Jun. 4, 2002

(54) AUTOMOBILE EXTERNAL WIDE-ANGLE REARVIEW MIRROR

(75) Inventor: Min-Hwa Chou, Tainan (TW)

(73) Assignee: DBM Reflex of Taiwan Co., Ltd., Tainan (TW)

( * ) Notice: Subject to any disclaimer, the term of this patent is extended or adjusted under 35 U.S.C. 154(b) by 0 days.

(21) Appl. No.: 09/946,570

(22) Filed: Sep. 4, 2001

(30) Foreign Application Priority Data

Mar. 9, 2001 (TW) ........................................ 90203519 U

(51) Int. Cl.[7] ................................................. G02B 5/10
(52) U.S. Cl. ........................ 359/868; 359/869; 359/870; 359/866
(58) Field of Search ................................. 359/868, 869, 359/870, 866, 867, 838, 864, 847, 848, 850, 857, 859

(56) References Cited

U.S. PATENT DOCUMENTS

| | | | | |
|---|---|---|---|---|
| 4,674,850 A | * | 6/1987 | Blom | 350/613 |
| 5,270,726 A | * | 12/1993 | Axtell et al. | 343/912 |
| 5,621,569 A | * | 4/1997 | Schlenke | 359/603 |
| 5,793,542 A | * | 8/1998 | Kondo et al. | 359/864 |
| 6,030,084 A | * | 2/2000 | Schmidt | 359/868 |
| 6,050,692 A | * | 4/2000 | Creek | 359/847 |

* cited by examiner

Primary Examiner—Mohammad Sikder
(74) Attorney, Agent, or Firm—Dellett and Walters

(57) ABSTRACT

An automobile external wide-angle rearview mirror, which is integrated with a main zone disposed at an inner side thereof and multiple upper and lower outer zones respectively disposed at an outer sides thereof and border upon the main zone at first and second tangent lines, wherein the main zone is defined with a predetermined curvature and symmetrical about a horizontal central line thereof, the multiple upper and lower outer zones are defined with curvatures gradually changed from inner sides to outer sides thereof; whereby the integrated rearview mirror of the invention provides a continuous image reflected therefrom with minimal blind spots, distortion and interferences.

3 Claims, 7 Drawing Sheets

AUTOMOBILE EXTERNAL WIDE-ANGLE REARVIEW MIRROR

BACKGROUND OF THE INVENTION

1. Field of the Invention

The present invention relates to an automobile external wide-angle rearview mirror, which has multiple wide-angle viewing zones integrated as a continuous reflective surface so as to reduce blind spots, distortions and interferences to increase driving safety.

2. Description of Related Art

Automobile external rearview mirrors are very important for driving safety, particularly when driving on a curved road, changing lane, cornering or backing up. The automobile external rearview mirror normally requires a necessary minimum range for visual angle, less interference and distortion and blind spots for the driving safety problem.

One conventional external rearview mirror is a plane mirror as shown in FIG. 6. The advantage of the plane type rearview mirror is that the image reflected therefrom is completely a plane image without any distortion. However the plane mirror has only a narrow visual angle, which is a main drawback of the conventional plane type rearview mirror.

As shown in FIG. 7, a stick-on type arc-surface wide-angle circular mirror (70) now available on the market can be attached on the plane mirror in order to give an enlarged the visual angle of the rearview mirror. Because the stick-on type arc-surface wide-angle circular mirror (70) normally has a small curvature, it certainly has a distorted reflecting image, which always interferes with the image reflected from the plane mirror. Moreover, the stick-on type mirror (70) often falls off the plane mirror because of moisture affecting the adhesion thereof or vibration.

Another conventional automobile external rearview mirror as shown in FIG. 8 is an arc-surface wide-angle rearview mirror defined with a large curvature. Therefore it normally has a visual angle larger than that of the plane type mirror. The problem of the arc-surface wide-angle rearview mirror is the image reflected from the arc-surface mirror still has some distortions especially when driving the automobile in a turning maneuver, in which time traffic accidents are caused frequently.

To overcome the shortcomings of the conventional automobile external rearview mirror, various improved automobile external rearview mirrors are designed. For an example, as shown in FIGS. 9 and 10, an automobile external wide-angle rearview mirror is integrated with a continuous reflective arc-surface including a main zone (80), an outer side zone (81), a lower side zone (82) and a non-action zone (83), which are respectively defined with different curvatures. The non-action zone (83) is disposed between the outer side zone (81) and the lower side zone (82), and is actually an extension portion of both the outer side zone (81) and the lower side zone (82), so that the image reflected from the non-action zone (83) is distorted to a great extent.

There is still another example as shown in FIG. 11, an automobile external rearview mirror is integrated with two separate parts, i.e., left and right parts, which are respectively defined with two different curvatures. However the images from the two different parts must interfere with each other, which certainly influences visual acuity of a driver.

Therefore, it is an objective of the invention to provide an improved automobile external wide-angle rearview mirror to mitigate and/or obviate the aforementioned problems.

SUMMARY OF THE INVENTION

The main object of the present invention is to provide an automobile external wide-angle rearview mirror, which is integrated with a main zone disposed at an inner side thereof and multiple upper and lower outer side zones respectively disposed at an outer side thereof. The main zone is defined with a predetermined curvature and extended symmetrically from a horizontal central line thereof to the upper and lower edges thereof. The main zone borders upon the multiple upper and lower outer zones at two tangent lines disposed substantially symmetrical at opposite sides of the horizontal central line thereof. The multiple upper and lower outer side zones are respectively defined with curvatures gradually changed from inner sides to outer sides thereof. Whereby the integrated automobile external rearview mirror of the invention provides a continuous reflective image with little distortion and interference in a large wide-angle visual range.

Other objects, advantages and novel features of the invention will become more apparent from the following detailed description when taken in conjunction with the accompanying drawings.

DETAILED DESCRIPTION OF THE PREFERRED EMBODIMENT

Figure 1:
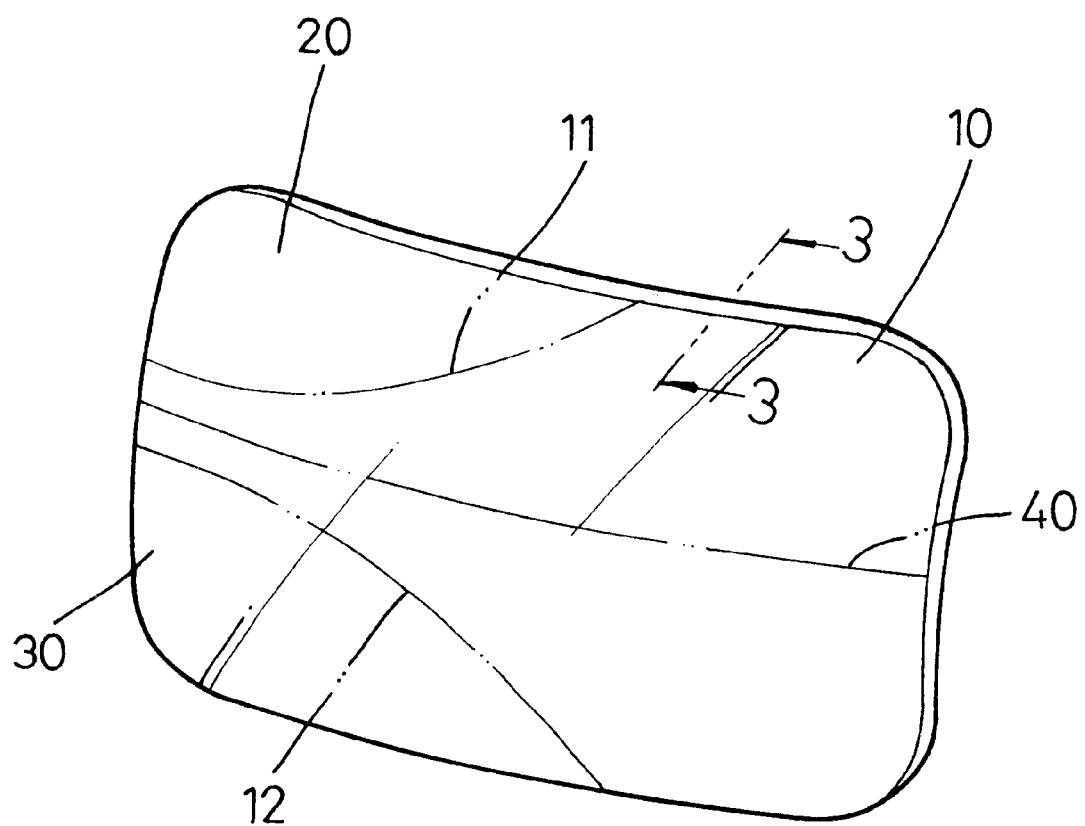
FIG. 1 is a perspective view of a first embodiment of the wide-angle review mirror in accordance with the invention.
Figure 2:
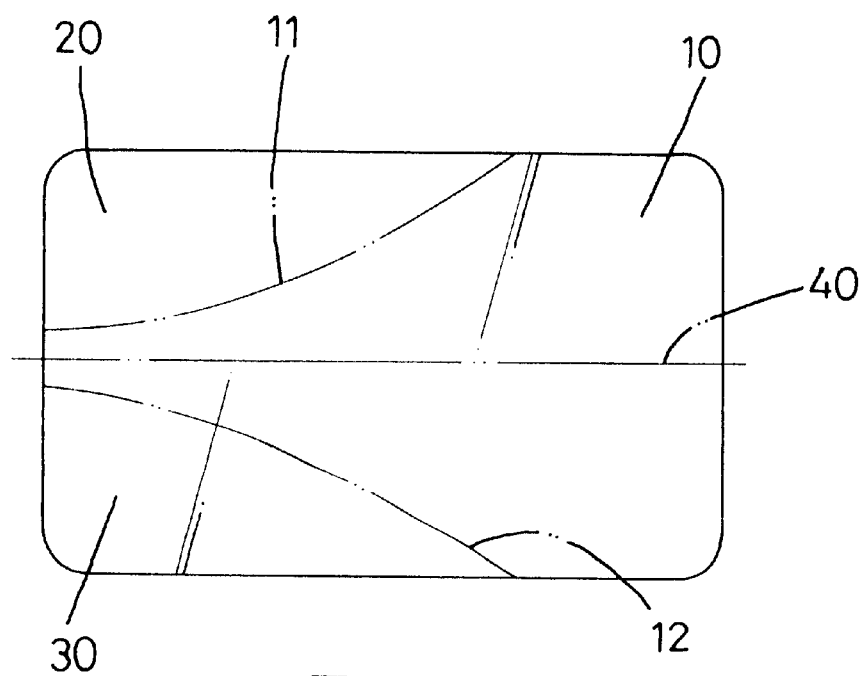
FIG. 2 is a plan view of the first embodiment of the wide-angle rearview mirror in accordance with the invention.
Figure 3:
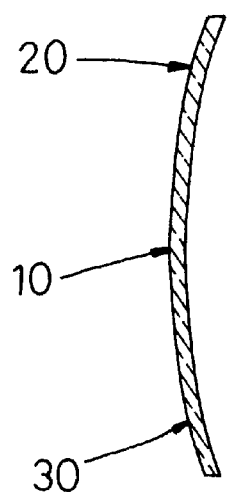
FIG. 3 is a cross sectional side view of the first embodiment of the wide-angle rearview mirror in accordance with the invention.

As shown in FIGS. 1 to 3, the present invention relates to an automobile external wide-angle rearview mirror, which is integrated with a main zone (10) disposed at an inner side thereof, an upper outer side zone (20) and a lower outer side zone (30) respectively disposed at an outer side thereof. The upper outer side zone (20) and the lower outer side zone (30) respectively border upon the main zone (10) at first and second tangent lines (11, 12), which are substantially symmetrical at upper and lower sides of a horizontal central line (40) of the main zone (10).

The main zone (10) is defined with a predetermined large curvature and extends symmetrically from the horizontal central line (40) to upper and lower edges thereof. The upper and lower outer zones (20, 30) are respectively defined with two curvatures which are respectively smaller than the curvature of the main zone (10).

Because the curvatures are changed gradually from the main zone (10) to the upper and lower outer side zones (20, 30) over the first and second tangent lines (11, 12), the tangent lines (11, 12) are invisible in images reflected from the rearview mirror. Therefore, the image reflected from the main zone (10) and the upper and lower outer side zones (20, 30) is a continuous image.

Figure 4:
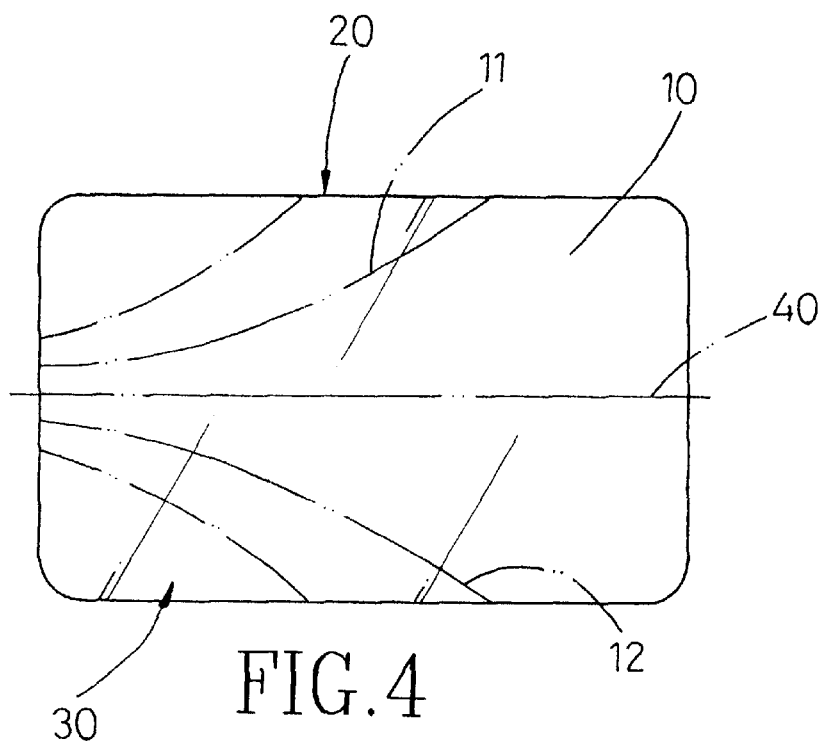
FIG. 4 is a plan view of a second embodiment of the wide-angle rearview mirror in accordance with the invention.

As shown in FIG. 4, in a further embodiment of the automobile external wide-angle rearview mirror of the invention, the upper and lower outer side zones (20, 30) respectively consist of multiple sub-zones, which are respectively defined with curvatures gradually and continuously changed from inner sides to outer sides thereof.

Figure 5:
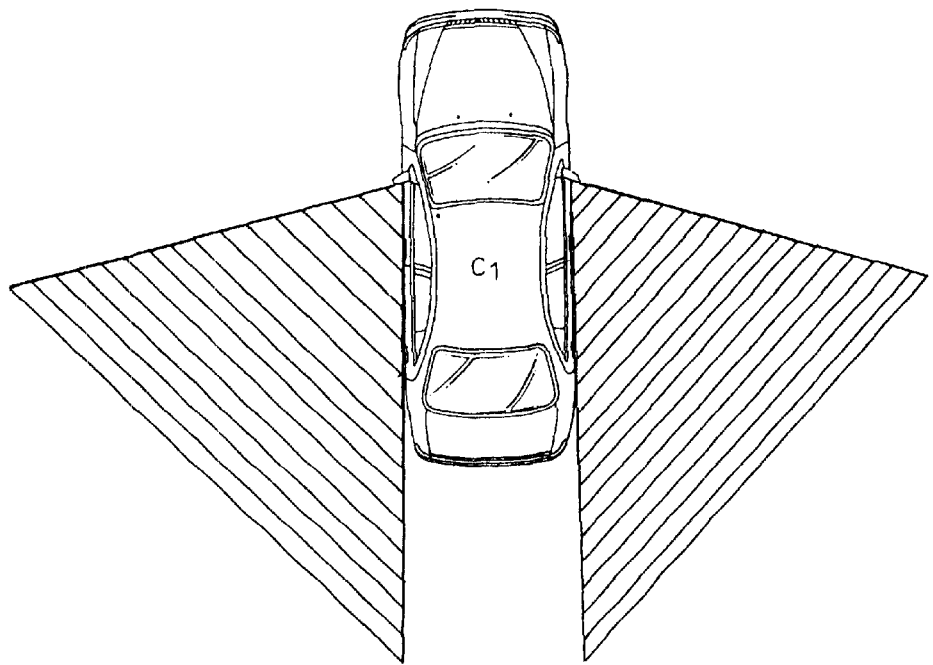
FIG. 5 is a schematic view of visual ranges of the wide-angle rearview mirror in accordance with the invention.
Figure 6:
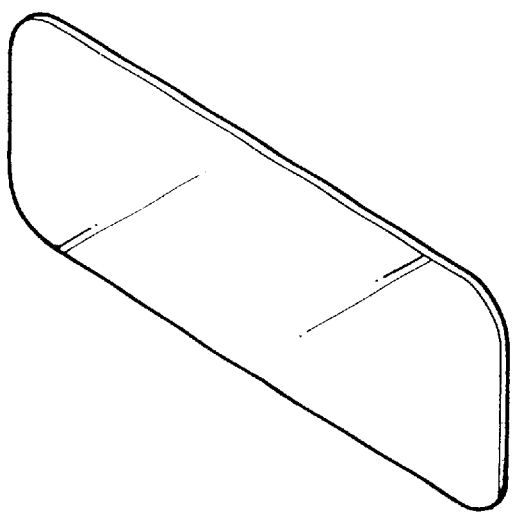
FIG. 6 is a perspective view of a conventional plane type rearview mirror.
Figure 7:
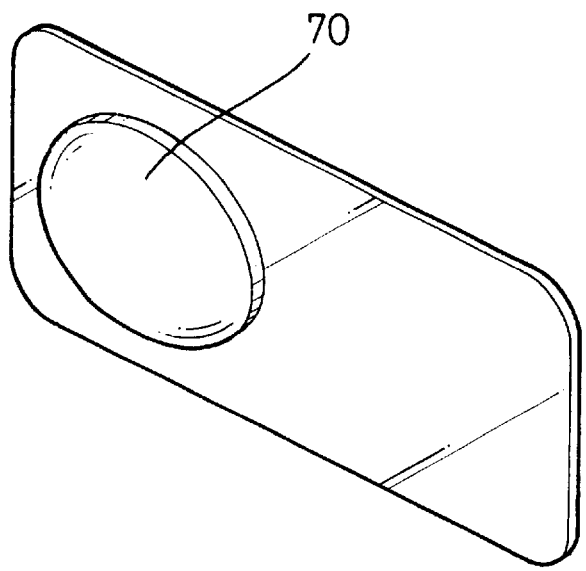
FIG. 7 is a perspective view of a stick-on type arc-surface wide angle rearview circular mirror being attached on the conventional plane type rearview mirror.
Figure 8:
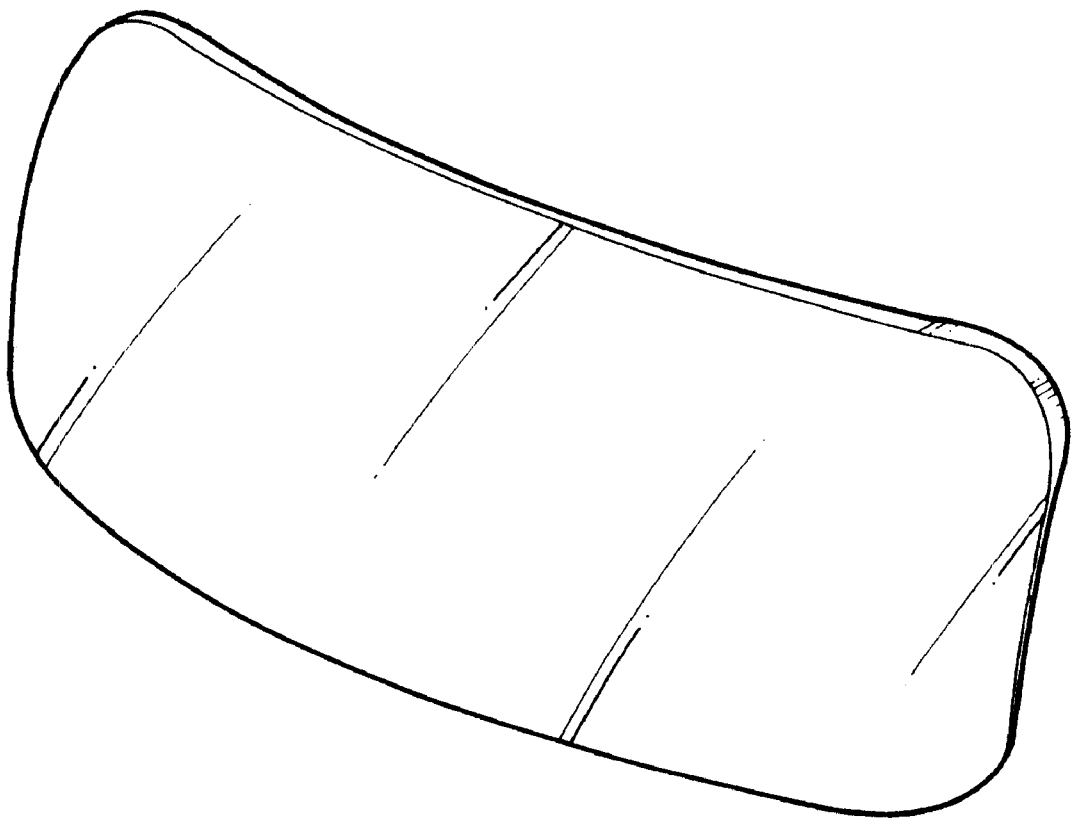
FIG. 8 is a perspective view of a conventional plane type rearview mirror; having an arc-surface defined with a large curvature.
Figure 9:
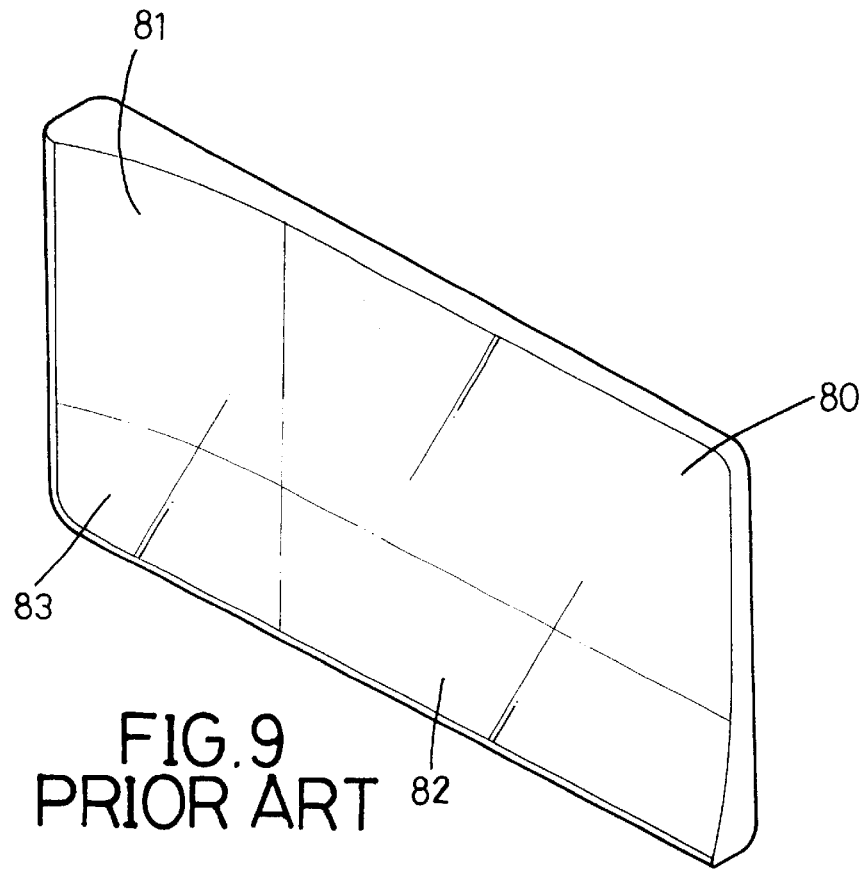
FIG. 9 is a perspective view of a stick-on type arc-surface wide-angle mirror integrated with multiple viewing zones respectively defined with different curvatures.
Figure 10:
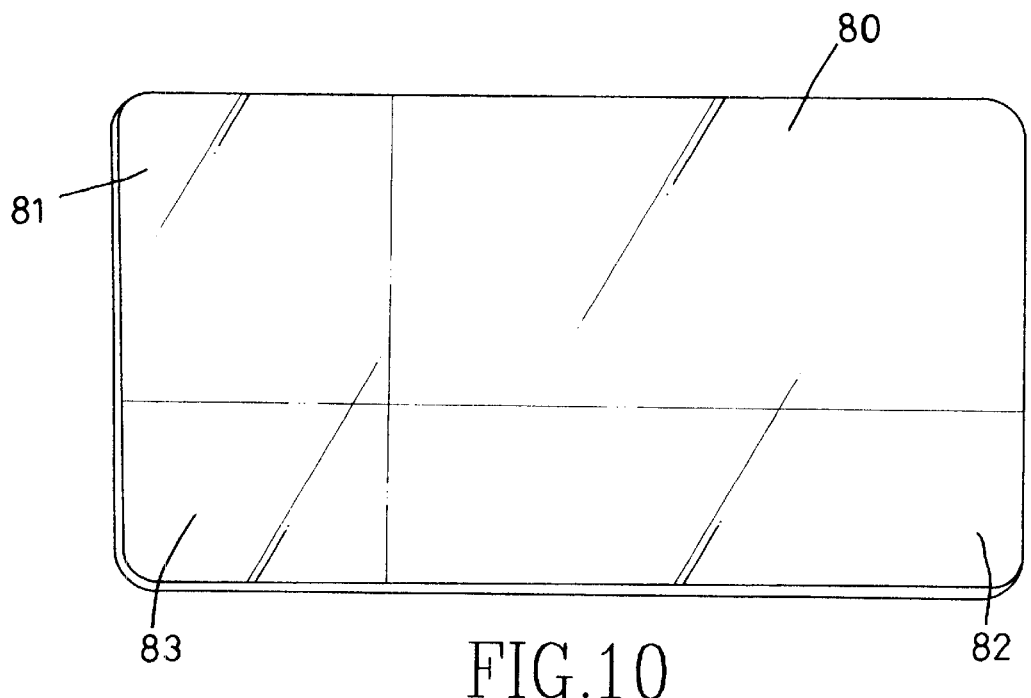
FIG. 10 is a plan view of the first prior designed wide-angle rearview mirror as shown in FIG. 9.
Figure 11:
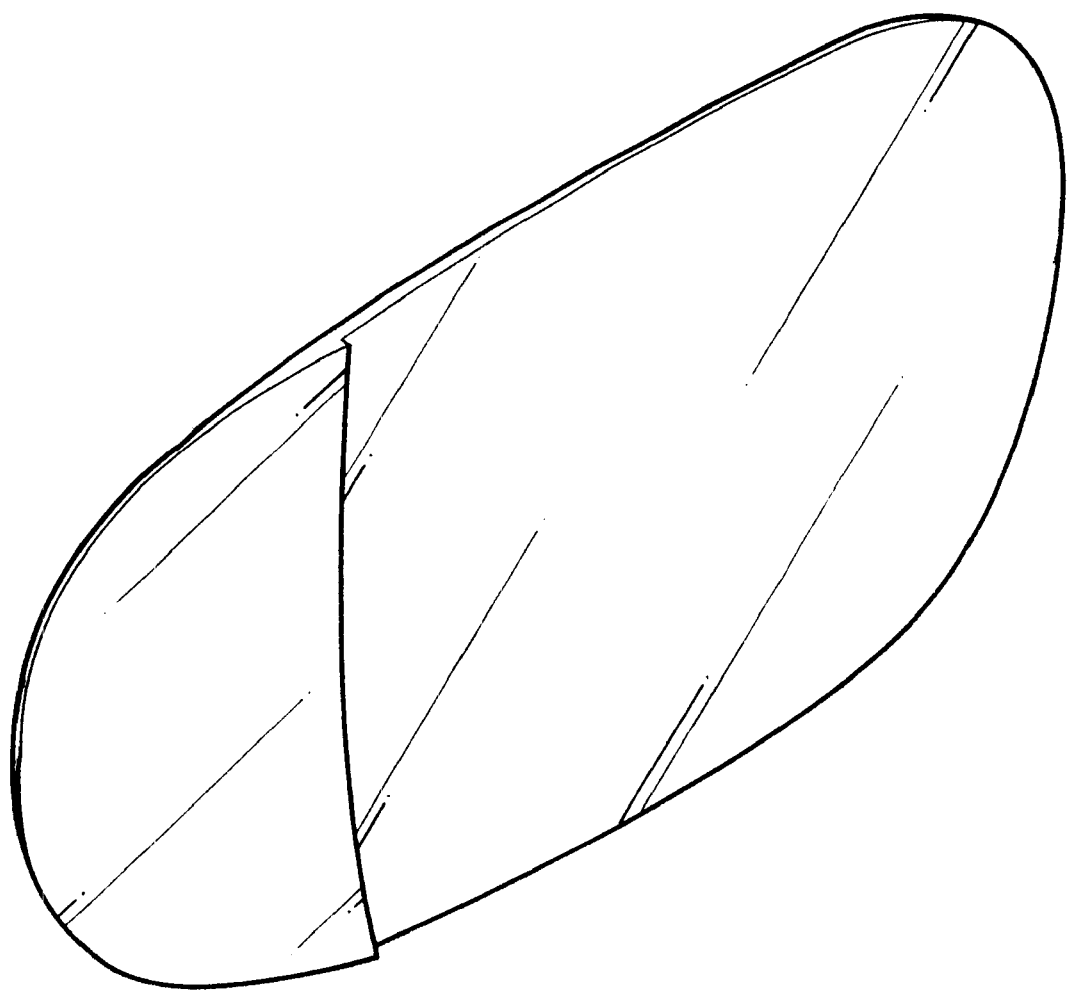
FIG. 11 is a perspective view of a second prior designed wide-angle rearview mirror integrated with two separate parts respectively defined with different curvatures.

With reference to FIG. 5, the rearview mirror of the invention reaches a visual range of proximally 75 degrees, such that blind spots within the visible image ranges of the invention are very small.

The automobile external wide-angle rearview mirror of the invention has the following advantages:

1. The visual range of the wide-angle rearview mirror of the invention reaches proximally 75 degrees, so that blind spots are greatly reduced when compared with conventional wide-angle mirrors.

2. The curvatures are changed gradually from the main zone (10) to the upper and lower outer side zones (20, 30), and the reflecting surface of the rearview mirror of the invention is integrated to provide a continuous reflective image, which prevents the refraction and reflection interferences.

3. Because the main zone (10) borders upon the upper and lower outer side zones (20, 30) at the first and second tangent lines (11, 12), and the curvatures are changed gradually from the main zone (10) to the upper and lower outer side zones (20, 30) over the first and second tangent lines (11, 12), distortion of the image reflected from the rearview mirror is low.

4. As the rearview mirror of the invention is integrally formed, it is easy to make a mold for the rearview mirror of the invention, therefore the production cost is low.

It is to be understood, however, that even though numerous characteristics and advantages of the present invention have been set forth in the foregoing description, together with details of the structure and function o f the invention, the disclosure is illustrative only, and changes may be made in de tail, especially in matters of shape, size, and arrangement of parts within the principles of the invention to the full extent indicated by the broad general meaning of the terms in which the appended claims are expressed.

What is claimed is:

1. An automobile external wide-angle rearview mirror, which is integrated with a main zone (10) disposed at an inner side thereof, an upper outer side zones (20) disposed at an outer side thereof and bordering upon the main zone (10) at a first tangent line (11) and a lower outer side zone (30) disposed at the outer side thereof and bordering upon the main zone (10) at a second tangent line (12), wherein the main zone (10) is defined with a predetermined curvature and extends from a horizontal central line (40) thereof to upper and lower edges thereof, the upper and lower outer zones (20) are respectively defined with curvatures that are respectively different to the curvature of the main zone (10), the curvatures are gradually changed from the main zone (10) to the upper and lower outer zones (20, 30) over the first and second tangent lines (11, 12).

2. The automobile external wide-angle rearview mirror as claimed in claim 1, wherein the upper and lower outer zones (20, 30) are respectively defined with two curvatures.

3. The automobile external wide-angle rearview mirror as claimed in claim 1, wherein the upper and lower outer zones (20, 30) are respectively defined with multiple curvatures which are respectively changed gradually from inner sides to outer sides.

* * * * *